(12) United States Patent
Mitsch (10) Patent No.: US 8,210,507 B2
(45) Date of Patent: Jul. 3, 2012

(54) HYDRAULICALLY PRESTRESSED ELASTOMER SPRING ELEMENT AND THE USE THEREOF IN WIND TURBINE BEARINGS

(75) Inventor: Franz Mitsch, Heppenheim (DE)

(73) Assignee: FM Energie GmbH & Co. KG, Heppenheim (DE)

( * ) Notice: Subject to any disclaimer, the term of this patent is extended or adjusted under 35 U.S.C. 154(b) by 1020 days.

(21) Appl. No.: 12/138,671

(22) Filed: Jun. 13, 2008

(65) Prior Publication Data

US 2008/0308980 A1    Dec. 18, 2008

(30) Foreign Application Priority Data

Jun. 14, 2007 (EP) .................................. 07011643

(51) Int. Cl.
*F16F 7/00* (2006.01)
(52) U.S. Cl. ..... 267/141.1; 267/35; 267/294; 267/140.4
(58) Field of Classification Search .................. 267/35, 267/292, 294, 140.4, 141, 141.1, 141.2; 248/621, 248/631
See application file for complete search history.

(56) References Cited

U.S. PATENT DOCUMENTS 3,920,231 A * 11/1975 Harrison et al. ................ 267/35

FOREIGN PATENT DOCUMENTS

EP   1 566 543   8/2005

* cited by examiner

*Primary Examiner* — Robert A Siconolfi
*Assistant Examiner* — Vu Q Nguyen
(74) *Attorney, Agent, or Firm* — Davis & Bujold, P.L.L.C.

(57) ABSTRACT

The invention relates to spring elements and bearings which contain these spring elements, the spring stiffness of the bearings and spring elements being individually adjustable by deformable elastomer bodies or elastomer layers by prestressing. The deformation of the elastomer layers and hence of the spring elements is achieved by an appropriately designed hydraulic device. The leak-tightness of the spring elements and bearing elements according to the invention is achieved through special hydraulically prestressed sealing elements, use of a pressure membrane and special structural features of the elastomer elements.

32 Claims, 10 Drawing Sheets

HYDRAULICALLY PRESTRESSED ELASTOMER SPRING ELEMENT AND THE USE THEREOF IN WIND TURBINE BEARINGS

This application claims priority from EP Application Serial No. EP 07 01 1 643.9 filed Jun. 14, 2007.

FIELD OF THE INVENTION

The invention relates to spring elements and bearings which contain these spring elements, the spring stiffness of the bearings and spring elements being individually adjustable by deformable elastomer bodies or elastomer layers by prestressing. The deformation of the elastomer layers and hence of the spring elements is achieved by an appropriately designed hydraulic device. The leak-tightness of the spring elements and bearing elements according to the invention is achieved through special hydraulically prestressed sealing elements, use of a pressure membrane and special structural features of the elastomer elements. The elastomer bearing arrangements according to the invention, including their spring elements, are suitable, in particular, for use in two- or multi-point bearing arrangements in rotor constructions and gearbox constructions of large wind turbines, where they serve to absorb and damp drive-train vibrations, which can lead, in particular, to displacement forces, bending forces and deformation forces and can occur especially in extreme loading situations of the turbine.

BACKGROUND OF THE INVENTION

Elastic spring elements are known and are used in many areas of engineering, primarily for damping vibrations and forces. The spring element here has a defined stiffness which is predetermined by the type, size, shape and number of the elastomer layers present and which, where appropriate, can be designed to be variable within certain limits after installation of the spring element.

In the case of large wind turbines with outputs of more than two megawatts, strong forces quite often act, in particular, on the rotor blades, rotor shaft and drive-train bearing arrangement, but also on the nacelle itself, and these forces subject the two-, three- or four-point bearings usually used for the gearboxes and generators to great loads, meaning that corresponding, in particular also vertical, displacements, deformations, distortions and pitch movements of the turbine can result, possibly with damage to the material or individual components.

The drive train of wind turbines is generally fastened elastically to the machine carrier. This is done on account of structure-borne noise insulation and also to enable displacements of the system. The known bearings are normally equipped with passive elastic elements which can absorb at least some of such constraining forces and generated vibrations owing to their alignment and different preset stiffnesses.

In the event of very high, in particular suddenly and rapidly occurring loads (extreme load case) especially in the vertical direction, i.e. normally in the direction in which the elastomer spring elements with the usual arrangement have high spring stiffness, the elasticity or stiffness of these elements, which, with respect to their adjustable stiffness, are generally designed for average loads and normally applied forces, in particular on the drive-train bearing arrangement, is not sufficient, so that the aforementioned deformations, displacements and distortions which occur in the turbine lead to damage to the turbine, especially to the gearbox, as described in more detail below.

Figure 1:
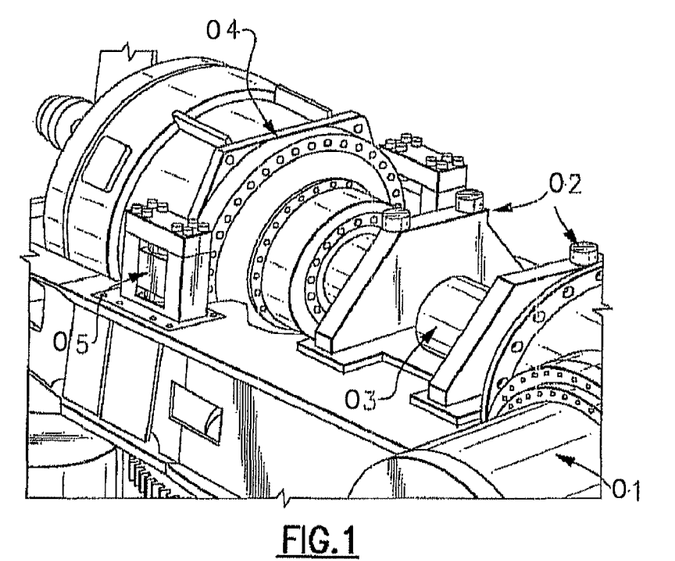
Figure 2:
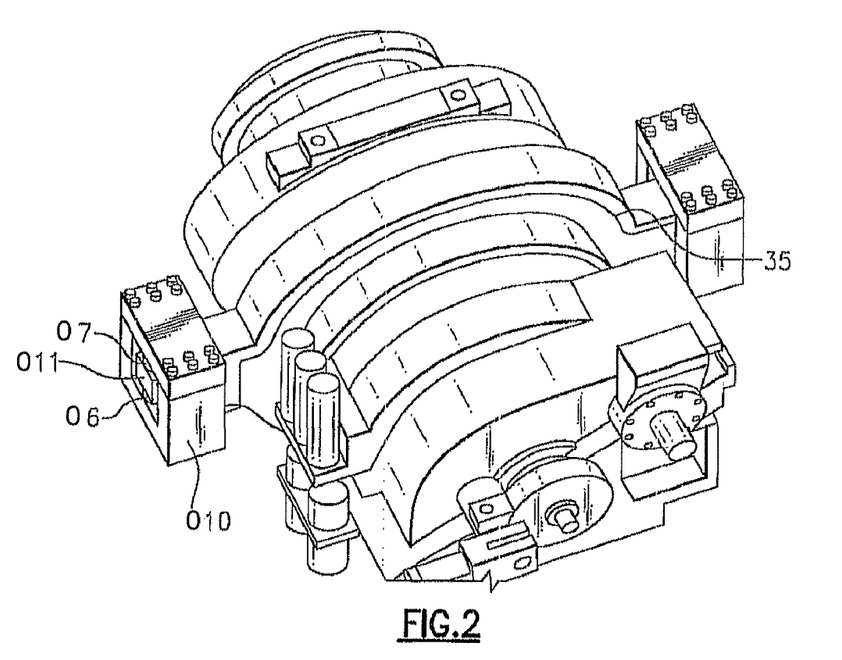

In the prior art, various systems are employed for supporting the drive train of wind turbines. One of the systems is the moment bearing arrangement with rigid rotor shaft (FIGS. 1 and 2). In this system, the rotor shaft is connected to the machine carrier in a cardanically rigid manner, i.e. two rolling bearings (02) (movable bearing and fixed bearing), which transmit all the yawing and pitching moments, are seated on the rotor shaft. The advantage of this system is that all the loads arising at the rotor (01) are transmitted directly into the tower on a short path. A further advantage is that, on dismounting the rotor, it is possible for the rotor shaft (03) and the gearbox (04) to remain in the turbine. At the same time, the gearbox can also be dismounted without removal of the rotor shaft. The support can be provided as described by two rolling bearings or by one large moment bearing which performs the same mechanical function. In accordance with the prior art, the torque is supported on both sides of the gearbox. The disadvantage of this system is the indeterminate support resulting from four bearing points. This indeterminate support gives rise to constraining forces which may have the following causes: manufacturing and assembly tolerances, misalignment, inclination at the rotor shaft and at the gearbox flange and not least bending of all load-bearing elements relative to one another in the event of unsymmetrically acting force transmission by the rotor. Besides the drive torque, other moments additionally occur at the rotor. These are caused, for example, by uneven wind interference suppression or by the rotor blade moving past the tower.

In accordance with the prior art, elastomer components that are as soft as possible are used for the gearbox torque support, so that the displacement forces are kept as small as possible. However, this also causes a large rotary movement of the gearbox on load transmission, which in turn causes a displacement of the gearbox output shaft relative to the generator shaft, which is disadvantageous, and consequently this softness of the elastomer components can only be used to a limited extent, or accordingly complex couplings are required between gearbox and generator.

The system described in EP 1 566 543 A1 enables the constraining forces explained above to be removed from the four-point bearing arrangement of the turbine. This application describes an elastomer bearing arrangement for wind turbines with adjustable stiffness, in which the stiffness of the elastomer elements in the vertical direction can be varied by a hydraulic or mechanical device. These spring elements essentially consist of a connecting plate and an end plate between which is located at least one elastomer layer, the connecting plate having an opening with a connecting part, through which opening pressure can be exerted on the elastomer layer by a displacement element in the form of a hydraulic fluid or a movable piston element, with the result that an increase in prestress of the spring element and thus a stiffening in the vertical direction is achieved.

In practice, these spring elements, although achieving the desired technical effects in respect of the damping, have proved to be problematical since, under the requisite high pressures that have to be generated in order to increase the stiffness in the vertical direction sufficiently, leak-tightness problems repeatedly occur, with loss of hydraulic fluid, even though the elastomer layers compressed by hydraulic fluid are firmly connected to the surrounding parts by vulcanization and/or adhesive bonding.

After further investigations and tests with the spring element described in EP 1 566 543, but also generally in other elastomer bearing arrangements of the prior art, it has now been found, surprisingly, that large-volume elastomer components in particular cannot be readily sealed when they are in contact with hydraulic fluids of whatever type (e.g. water, oil, alcohols, mixtures of the same) under pressure. Small droplets of the hydraulic fluid are apparently absorbed, on continuous loading and under higher pressures, by the porous structure present, particularly in the case of large elastomer volumes, and are continuously transported further by the flow structures which are difficult to avoid in the elastomer material, until they escape at various, often unexpected, points of the component. Without wishing to be tied to a theory, these results may be interpreted in such a way that a droplet of the hydraulic fluid in the corresponding hydraulic space is forced into a small notch or pore in the surface of the adjacent elastomer which opens and closes during the dynamic loading, so that the droplet is locked in and continuously conveyed further until it reaches the end of the elastomer or component and thus results in a leak. The escape of hydraulic fluid from the spring elements or bearings of EP 1 566 543 A1 thus represents a serious problem which has to be solved.

Moreover, it has been found that direct contact of the hydraulic fluid with the elastomer material of the spring elements may lead to reduced durability or elasticity of the elastomer under the influence of high pressures, meaning that the corresponding spring elements may have to be replaced earlier.

SUMMARY OF THE INVENTION

The object is thus to provide corresponding spring elements and bearings based on the basic concept of EP 1 566 543 A1 which, while having the same or improved adjustability of the stiffness of the spring element, do not have the described disadvantages of the corresponding bearing arrangements of the prior art.

The object has been achieved by the spring elements, bearings and their use specified below and in the claims.

The invention thus relates to a spring element which can be adjusted in stiffness by hydraulically produced pressure and is composed of layers, and essentially comprising two or more elastomer layers (1), nonelastic intermediate layers (2), one or more hydraulic devices including sealing elements (4, 7, 9, 11, 12) and, where appropriate, nonelastic cover plates, two elastomer layers being separated from one another by a nonelastic intermediate layer or intermediate plate, and the nonelastic layers having a centrally arranged opening or hole, so that the spring element has, at least in the interior, a continuous elastomer core to which the elastomer layers are connected, the hydraulic device being provided—viewed in the vertical direction with respect to the layers—on one or both sides of the spring element and, by displacement or introduction of a hydraulic fluid into the spring element by means of hydraulic pressure, causing compression of the elastomer material (1) in the core region thereof in the vertical direction with respect to the layers, so that a displacement space results or is increased. The spring element is distinguished here by the fact that an elastic pressure membrane (5) is arranged between the elastomer layer in the core region of the spring element and the displacement space and is firmly connected at its preferably outer edge to the hydraulic device or parts thereof resulting in a membrane space (12) which, at least in the presence of a hydraulic pressure, corresponds to the displacement space and contains hydraulic fluid, and the hydraulic device comprises one or more sealing elements which are prestressed and are arranged such that they generate an increased pressure on the pressure membrane in the region of its connection to the hydraulic device, compared with the pressure in the membrane space, whereby the firm connection to the hydraulic fluid-containing membrane space becomes absolutely pressure-tight even at very high pressures in the interior of the membrane space.

For the purposes of the invention, "displacement space" is generally taken to mean the space which results owing to compression of elastomer material by the introduction of a hydraulic fluid into the spring element with generation of a hydraulic pressure, or may already be present beforehand. In contrast, "membrane space" (12) is taken to mean the geometrical space which is formed between the membrane plate (9) and the pressure membrane (5) stretched over the latter. Under pressure, the membrane space generally essentially corresponds to the displacement space.

In particular, the invention relates to a corresponding spring element in which the elastic pressure membrane (5) rests on a membrane plate (9) belonging to the hydraulic device and is connected at its edge to the membrane plate via an elastic bead (10) which fills a T-slot-shaped recess (10a) in the membrane plate, and a nonelastic pressure-increasing element (6), preferably a profiled ring, is arranged between the elastomer layer (1) and the pressure membrane in the region of its bead, which element has a correspondingly shaped profile which, under prestress which has to correspond to a higher pressure than the pressure in the membrane space (12), is forced into the elastic material in the region of the bead of the pressure membrane, and thus leads to specific sealing in the region of the T-slot of the membrane plate.

Furthermore, it has been found that the sealing is particularly advantageous, stable and complete if a prestressing free space (10c) is provided between the pressure-increasing element (6) and the elastic bead (10) of the pressure membrane, which free space can be formed by a corresponding, preferably wedge-shaped, recess in the material of the sealing elements or the corresponding parts of the hydraulic device.

Figure 9:
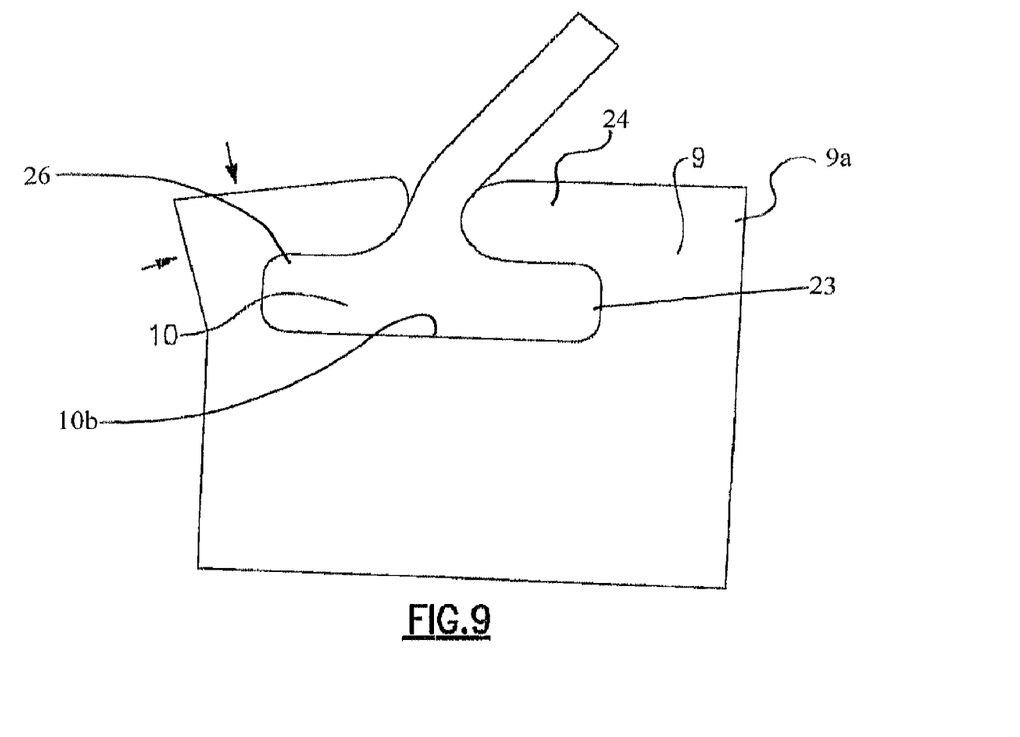
Figure 10:
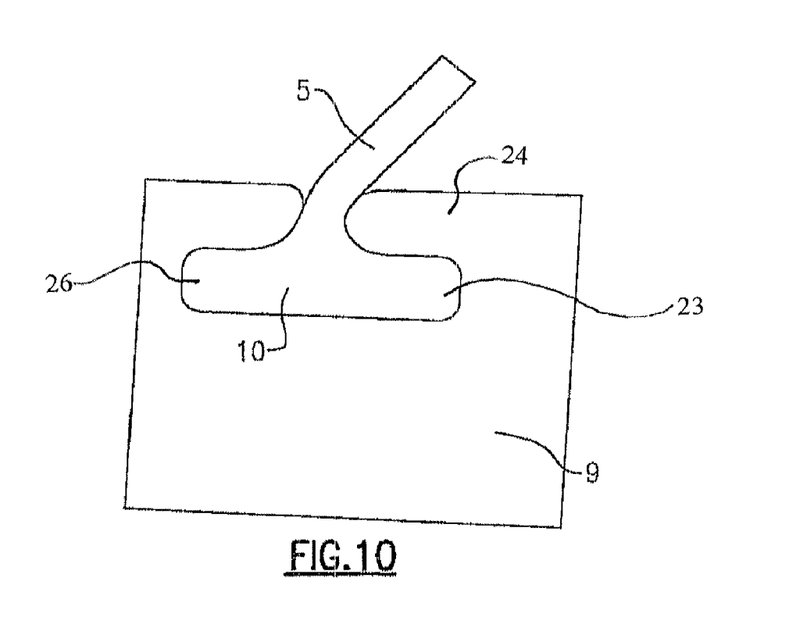

In a particularly simple embodiment, the pressure-increasing element (6), for example the profiled ring, is omitted and functionally replaced by the membrane plate (9), which in this case, however, is compressed in the region of the T-slot, so that an increased pressure occurs locally, leading to stronger sealing in this region (FIG. 9).

Figure 6:
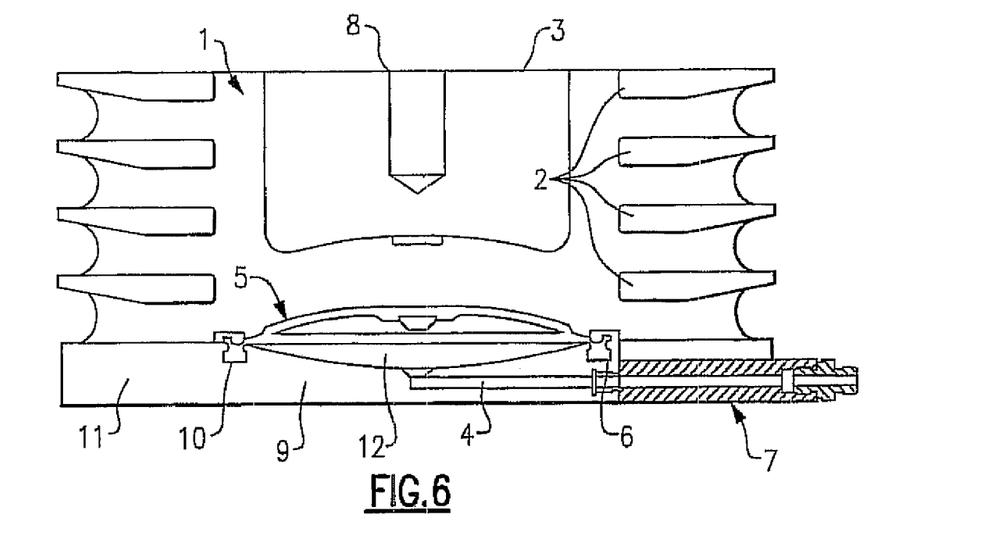
Figure 7:
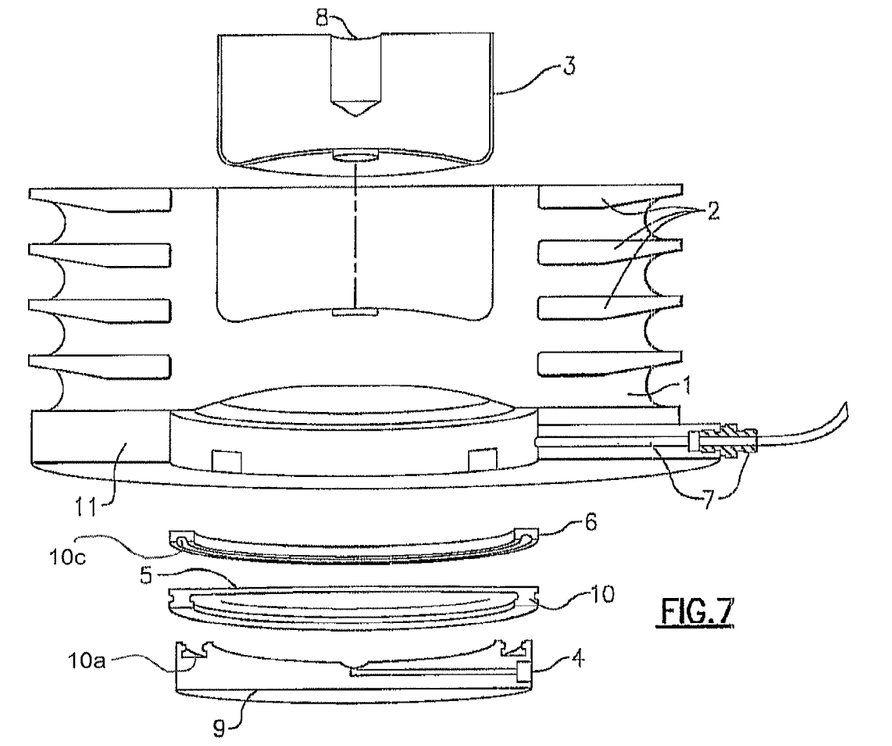
Figure 8:
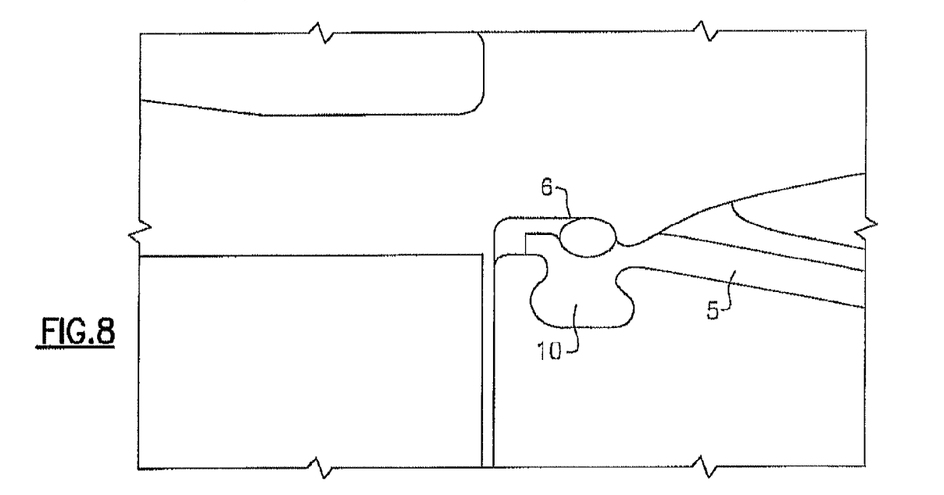

In the embodiments of FIGS. 6, 7 and 8, the membrane is typically a circular membrane which lies flat on the membrane plate (9). By appropriate introduction of a hydraulic fluid, the membrane is swollen, causing compression of the elastomer layers (1) lying on the other side of the membrane and resulting in a displacement space or membrane space between the membrane plate (9) and the membrane (FIG. 6). In a further advantageous embodiment, the membrane plate (9) has a concavely curved surface, so that, when the pressure membrane (5) is stretched flat, even without pressure being produced, a membrane space is present which is formed between the lower side of the flat-stretched membrane and the concave surface of the membrane plate (FIGS. 7, 8).

In a further embodiment, the elastomer layer (1) can also have a concavely curved recess in the region of the contact surface with the pressure membrane (5).

In a particularly advantageous embodiment, both the membrane plate (9) and the elastomer layer lying over the pressure membrane have a correspondingly concave surface, so that a lenticular membrane space or displacement space is present.

The invention also relates to a corresponding spring element in which the membrane plate (9) has hydraulic supply lines (4) and hydraulic connections (7) which pass through the membrane plate and open into the membrane space and can supply the latter with hydraulic fluid.

In a further series of embodiments of the spring elements according to the invention, the elements have a support plate (11) for the elastomer layers (1), which preferably have a recess providing space for the membrane plate (9) as a separate part of the support plate.

In a particular embodiment, the membrane plate can also be clamped to the support plate itself in this solution.

The invention furthermore relates to spring elements of the same principle as described, but which, owing to their space-saving design, have special structural features. Thus, the invention comprises a spring element in which the elastic pressure membrane (5) has a circumferential terminal elastic T-shaped bead (10), consisting of an outer bead (26) and an inner bead (23), and is connected in a pressure-tight manner to a membrane plate (9) belonging to the hydraulic device in such a way that the beads are inserted into a correspondingly shaped matching T-shaped hollow profile (10b) which is formed by a correspondingly shaped membrane head (9a) and a prestressing disk (21), where (a) the membrane head is part of the membrane plate (9) and is arranged inside the membrane and the membrane space (12) and has a circumferential projecting lip (24) which receives the inner bead (23) of the membrane, and (b) the prestressing plate has a ring-like opening or recess which receives the membrane head (9a) with the pressure membrane in a precise-fitting manner, and the edge of the opening/recess is formed by a projecting lip which receives the outer elastic bead (26) of the membrane.

In a particular embodiment, the prestressing disk (21) rests wholly or partly on the membrane plate (9) except for the region of the membrane head (9a) and is arranged between the first elastomer layer (1) or, where appropriate, the elastomer support plate and the membrane plate. In this case, the prestressing disk (21) is preferably firmly connected to the elastomer layers (1) outside the region of the pressure membrane.

Furthermore, the membrane plate (9) is preferably clamped against the prestressing disk (21) by means of fastening means, so that the T-shaped elastic bead (23, 26) of the pressure membrane is compressed.

In accordance with the invention, the prestressing disk or plate (21) can also be the support plate for the spring element itself, and in this embodiment it has in the region of the pressure membrane a precisely fitting recess in which the correspondingly shaped membrane plate (9) is inserted by its correspondingly shaped membrane head (9a) and is clamped to the plate (21) by a fastening means.

In the embodiments concerned, the membrane plate (9) generally has at least one hydraulic supply and hydraulic connection (4, 7), the hydraulic supply passing through the membrane head (9a) and opening into the membrane space (12).

The space-saving spring elements also preferably have a prestressing free space (22) which, in the unclamped state, is formed in the region in which the outer bead (26), membrane disk (9) and prestressing disk (21) meet and which completely closes when parts (21) and (9) are clamped as a result of bead material being forced in.

The elastic pressure membrane (5) according to the invention should, in accordance with the invention, have a certain softness and flexibility. Such membranes are preferably suitable for spring elements according to the invention in which a large area is necessary or desired. In spring elements which must not take up much space, such large-area pressure membranes are not desired and are replaced, in accordance with the invention, by the conical or paraboloidal membranes, which are preferably used in a stiff and less flexible design, but one which is elastic with regard to stretching. The invention thus also relates to spring elements in which the pressure membrane (5) is stiff and has a paraboloidal or conical three-dimensional shape which forms, with the membrane head (9a) located at the base, a correspondingly shaped conical cap-like membrane cavity (12) or a conical membrane cap (12a).

In particular, the invention also relates to corresponding spring elements in which the elastomer layers (1) have, in the core of the spring element, a conical cavity which is shaped in a manner corresponding to the membrane cavity (12) and is filled by the conical membrane cap (12a) formed by the pressure membrane. Such spring elements can be modified in such a way that the membrane cavity (12) of the conical pressure membrane cap (12a) has a stop device (50) which, in the event of overloading of the system, prevents the conical pressure membrane from irreversibly collapsing. Such a stop device is produced from a nonelastic material, preferably in the form of a conical cap which is arranged centrally in the interior of the membrane cavity (12) on the base of the membrane cap (12a) and has a supply conduit and a connection to the hydraulic supply line (4). The supply conduit can also be designed in the form of an annular gap.

In general, the hydraulic devices described, including pressure membranes and sealing elements, can be mounted on both (the upper and lower) sides of the spring element. Such spring elements are particularly suitable if they have to be very large, so that a pressure generated on one side may be unfavorable. In most cases, it is sufficient for the spring element to be fitted with a corresponding device on one side only.

In these cases, a spring element of this type can be fitted in such a way that it has, on the side opposite the hydraulic device, a recess or cavity (40) in the elastomer material in the core region of the spring element, which recess or cavity is shaped and configured in such a way that it is separated from the membrane space (12) by means of a web (42) of elastomer material of the layers (1), so that the web can be pushed into the cavity or the recess when the hydraulic pressure in the membrane space increases. As a result, a greater range of adjustment of the stiffness is possible, particularly if the recess or cavity (40) additionally has a nonelastic calibration element (3, 8), with the aid of which the volume of the recess or the cavity (4) can be altered.

The spring elements described are extremely suitable for use as bearings for machines or gearboxes. The invention thus relates to a bearing arrangement, comprising at least two opposite spring elements which are oriented or arranged in the same way and thus act in the same way with respect to their damping properties and between which the gearbox or machine is mounted, as described above, below and in the claims. In order to achieve an optimum damping action, the spring elements according to the invention are connected to one another by hydraulic lines (34, 35) arranged crosswise, thereby providing the bearings with the further described properties. Furthermore, they can be equipped with at least one pressure relief valve (31) and a throttle valve (33, 36, 37) for specific control when the turbines are under load, as likewise explained below.

Finally, the invention relates to the use of the bearings and spring element described. These are provided for use in machines, but in particular wind turbines, where they serve to absorb bending forces, deformation forces and displacement forces which occur, particularly in the case of extreme loads, in the vertical direction with respect to the mounted spring elements.

BRIEF DESCRIPTION OF THE DRAWINGS

The figures are briefly explained below:

| FIG. 1 | Entire system |
|---|---|
| FIG. 2 | Gearbox with elastomer-hydraulic torque support |
| FIG. 3 | Properties in the case of torque |
| FIG. 4 | Properties in the case of displacement |
| FIG. 5 | Stiffness characteristic |
| FIG. 6 | Planar membrane |
| FIG. 7 | Planar membrane exploded view |
| FIG. 8 | Planar membrane detail of pressure-increasing ring |
| FIG. 9 | Planar membrane increase in prestress by deformation of membrane plate |
| FIG. 10 | Planar membrane increase in prestress by deformation of membrane plate |
| FIG. 11 | Structure with parabolic membrane |
| FIG. 12 | Structure with parabolic membrane exploded view |
| FIG. 13 | Parabolic membrane detail of prestressing free space |
| FIG. 14 | Prestressing via inner disk |
| FIG. 15 | Membrane vulcanized on with closable opening for tool penetration |
| FIG. 16 | Hydraulic line with pressure relief valve and throttle |
| FIG. 17 | Parabolic (conical) membrane with cavity in elastomer core |
| FIG. 18 | Parabolic (conical) membrane with cavity in elastomer core and clamping screw in hole of membrane plate |
| FIG. 19 | Parabolic (conical) membrane with cavity in elastomer core and limit stop in membrane space |
| FIG. 20 | Membrane plate with holes and filling line and filling cock |

The references used in the text, claims and figures are also explained:

| For FIGS. 1-5 | |
|---|---|
| 01 | Rotor |
| 02 | Rotor bearing |
| 03 | Rotor shaft |
| 04 | Gearbox |
| 05 | Elastomer-hydraulic torque support |
| 06 | Elastomer component with pressure side at the bottom |
| 07 | Elastomer component with relief side at the top |
| 08 | Elastomer component with pressure side at the top |
| 09 | Elastomer component with relief side at the bottom |
| 010 | Yoke for torque support |
| 011 | Gearbox-side torque support |
| 012 | Vertical displacement direction |
| 013 | Torque |

Figure 11:
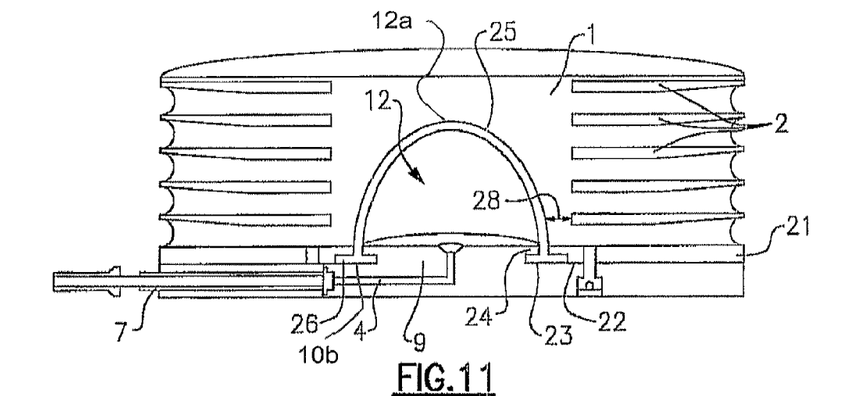
Figure 12:
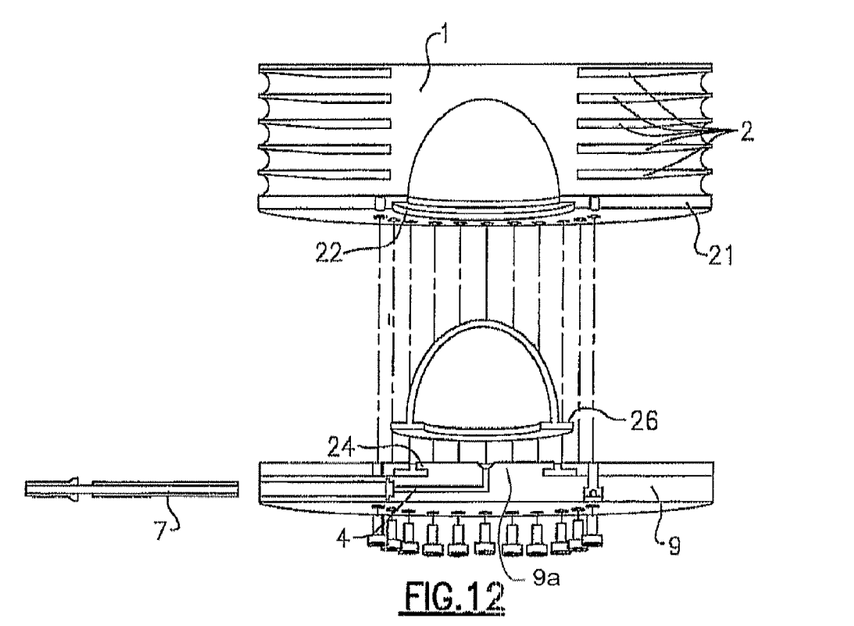
Figure 13:
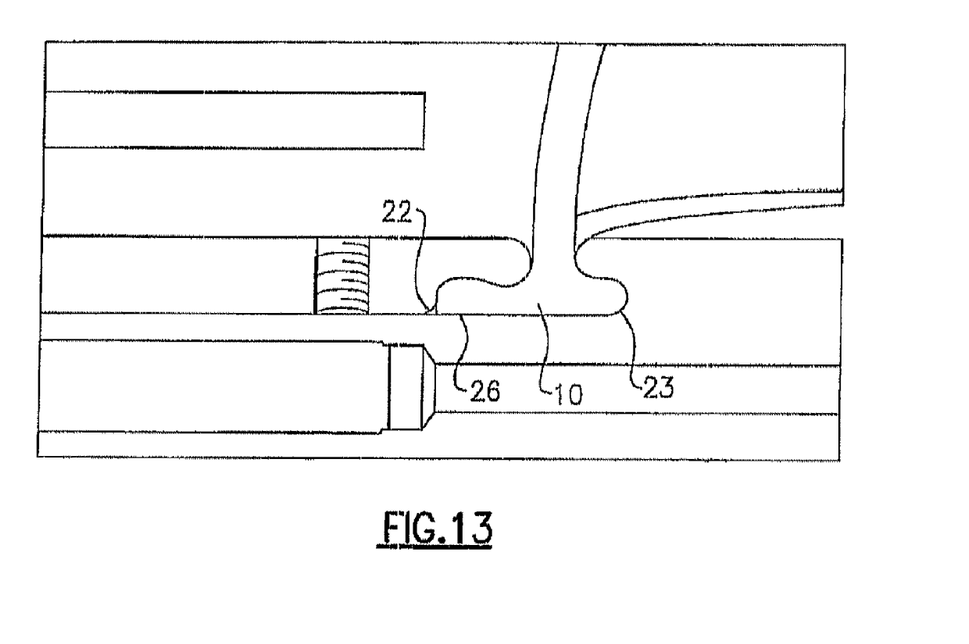

| For FIGS. 6-20 | |
|---|---|
| 1 | Elastomer |
| 2 | Intermediate metal plates |
| 3 | Calibration element |
| 4 | Fluid supply |
| 5 | Planar membrane |
| 6 | Pressure-increasing ring |
| 7 | Hydraulic connection |
| 8 | Calibration hole |
| 9 | Membrane plate |
| 9a | Membrane head |
| 10 | Elastic sealing bead |
| 10a | T-slot-shaped recess in (9) |
| 10b | T-slot-shaped hollow profile (FIGS. 11, 12) |
| 10c | Prestressing free space |
| 11 | Lower support plate |
| 12 | Membrane space (displacement space) |
| 12a | Parabolic (conical) membrane, conical cap |
| 13 | Screws and holes for membrane clamping |
| 21 | Prestressing ring, prestressing plate |
| 22 | Prestressing free space |
| 23 | Inner bead |
| 24 | Inner-bead clamping lip |
| 25 | Parabolic membrane |
| 26 | Outer bead |
| 28 | Spacing from membrane metal plate |
| 31 | Pressure relief valve |
| 32 | Solenoid valve |
| 33 | Throttle in connecting train |
| 34 | Pipeline on pressure side |
| 35 | Pipeline on relief side |
| 36 | Throttle in main train on relief side |
| 37 | Throttle in main train on pressure side |
| 40 | Cavity for volume increase |
| 41 | Cavity vent |
| 42 | Separating web (elastomer) between membrane space and cavity 40 |
| 43 | Filling cock |
| 44 | Filling line |
| 50 | Limit stop |
| 51 | Fluid conduit through limit stop 50 |

DETAILED DESCRIPTION OF THE INVENTION

The elastomeric materials used for the layers (1) according to the invention consist essentially of a natural rubber, a natural rubber derivative or of a suitable elastic polymeric plastic or plastic mixture. The elastomer layer can, in accordance with the invention, have different hardness ("Shore hardness") and different damping properties, according to the desired requirements. Elastomers having a Shore A hardness of 20 to 100, in particular 30 to 80, are preferably used. The production of such elastomers of different hardness is known in the prior art and adequately described in the relevant literature.

The non-elastomeric intermediate plates or intermediate layers (2) are, in accordance with the invention, as far as possible made from nonelastic materials of low compressibility. These are preferably metal plates, but other materials, such as hard plastics, composite materials or carbon-fiber-containing materials, can also be used. The intermediate plates and the elastomeric materials (4) are generally connected to one another by vulcanization.

The pressure membrane (5) is generally likewise made from natural rubber or a natural rubber derivative. The material must be tear- and pressure-resistant over a large range. It is preferably of a smooth, dense structure which does not have surface pores, or only has pores of very small diameter which cannot absorb microdroplets of the hydraulic fluid.

Generally, all conventional pressure-stable fluids can be used as the hydraulic fluids. For wind turbines, water, to which, where appropriate, antifreeze, alcohols or additives are added, is also suitable, for example. Likewise, hydraulic oils can also be used.

The spring element according to the invention can be used in two basic structural embodiments. The first embodiment is based on a flat membrane (5) which occupies a relatively large area on the membrane plate (9). The displacement space or membrane space (5) is formed, in particular, by the swelling of the membrane lying flat on the membrane plate, with simultaneous compression of the elastomer layers (1) above the pressure membrane. Recesses, preferably of concave type, in the elastomer layer above the membrane and/or in the membrane plate (9) below the membrane can create a displacement space even in the unpressurized state. While the flat membrane (FIG. 6) has a relatively flat, preferably lenticular shape, the second basic embodiment is represented by the parabolic or conical membrane (FIGS. 11-19), which has the conical shape or is a paraboloid even in the unpressurized state. The membrane essentially has a sealing function between the fluid and the elastomer body.

FIGS. 6 and 11-19 illustrate an elastomer component having a plurality of layers (e.g. 4 layers). The special feature compared with conventional layered springs is that the intermediate metal plates (2), which are preferably circular, have a hole, preferably in the center, so that the nonelastic structure is present only in the outer region. In the inner region, the core region, only elastomer (1) is present, preferably having a recess in the region which receives the membrane surface. By introducing a greater or lesser amount of fluid into the membrane, elastomer volume is displaced, resulting in an increase in stiffness for the same physical height of the element as a whole.

The spring elements according to the invention comprise a membrane plate (9) which contains an opening for connection of the hydraulic lines. Furthermore, the membrane plate contains an annular T-slot (10), into which the planar membrane (5) is vulcanized. The special feature of the vulcanization is that a connection occurs only in the region of the T-slot. The remaining region remains without a connection, resulting in a cavity for introducing the hydraulic medium into the membrane space (12). In accordance with the invention, the leak-tightness of the T-shaped connection is very important. In the prior art, this is achieved on the one hand by depositing a binder in the T-slot prior to the vulcanization, so that a rubber/metal bond results. According to the prior art, this rubber/metal bond is the to be absolutely leak-tight. As already described in detail above, however, practical tests on which this invention is based have shown that this is not the case because the droplet migration discovered by the inventor is responsible for this and leads to the binder between rubber and metal being displaced fractionally on dynamic loading. It becomes clear from this that a higher pressure must be produced at these locations than in the other regions in order to achieve leak-tightness. This higher pressure is achieved in accordance with the invention by the pressure-increasing ring (6). The latter rests on the membrane and, owing to the high pressure and the relatively large upper surface, receives a prepressure, by means of which it can be forced into the T-slot of the membrane and thus produces a pressure increase in the T-shaped region (10), thereby preventing the binder from being displaced by penetrating hydraulic fluid. The pressure-increasing ring can be configured in a wide range of designs here. The crucial factor is ultimately that the pressure in the region is increased by a prestress.

A simple variant dispenses with a dedicated pressure-increasing ring. In these variants, described in FIGS. 9 and 10, the T-shaped slot is formed and vulcanized in the membrane plate (9). The outer region of the membrane plate is subsequently bent inward, causing a pressure increase to take place in the region of the T-slot (10) and ensuring leak-tightness.

In the embodiments of the flat-membrane spring elements (FIG. 6), pressures of 100 bar to 700 bar (1450 psi to 10150 psi) are provided.

Figure 14:
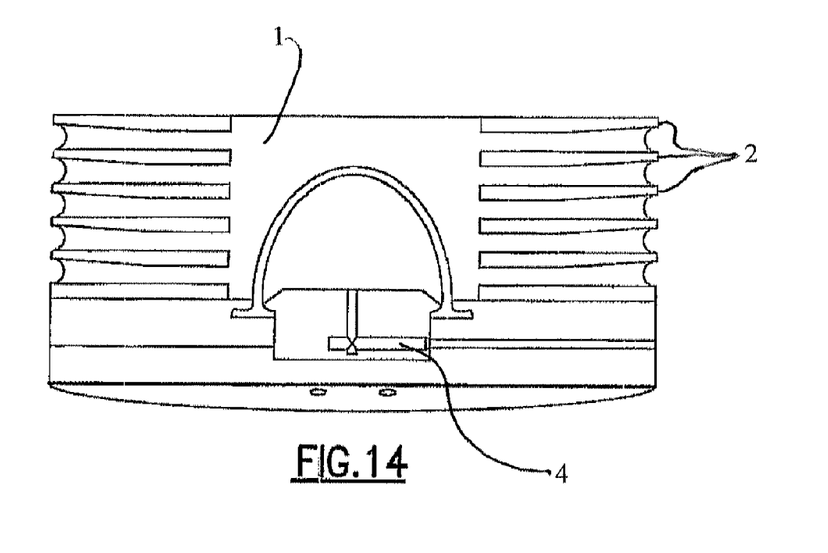
Figure 15:
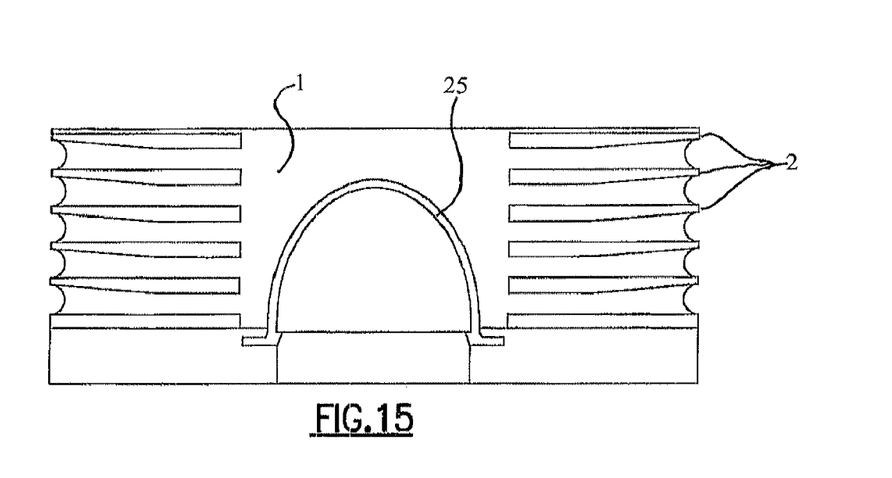
Figure 16:
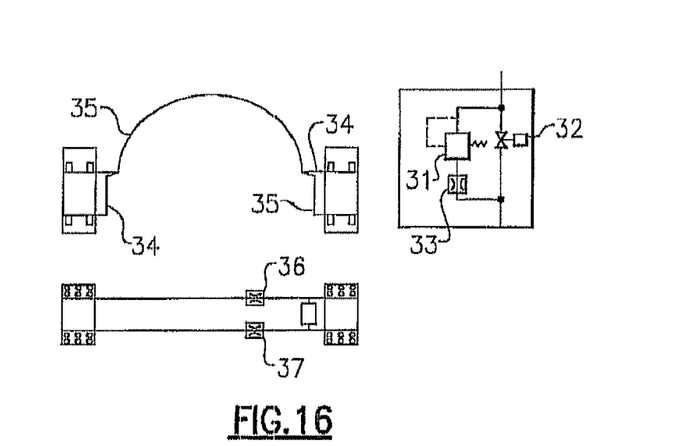
Figure 17:
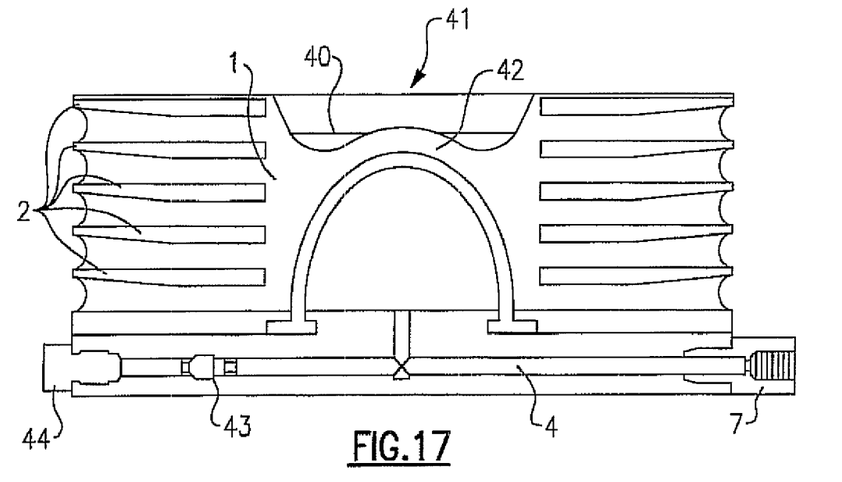
Figure 18:
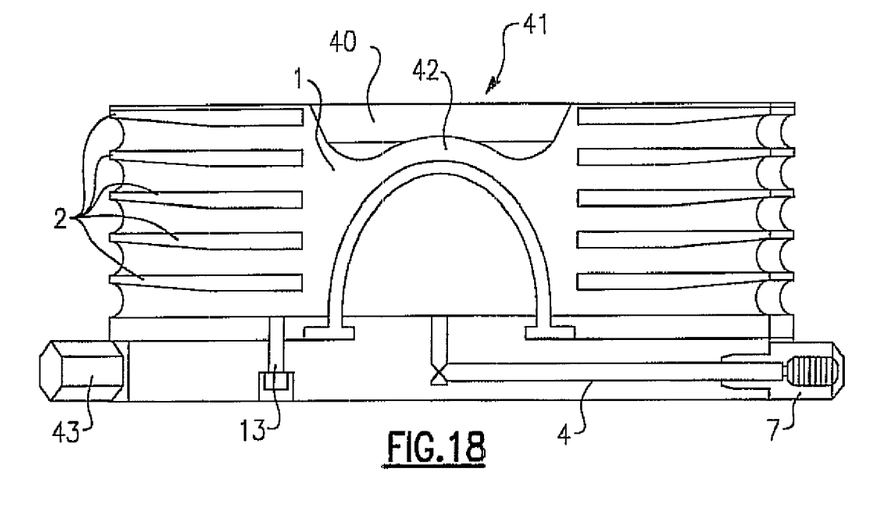
Figure 19:
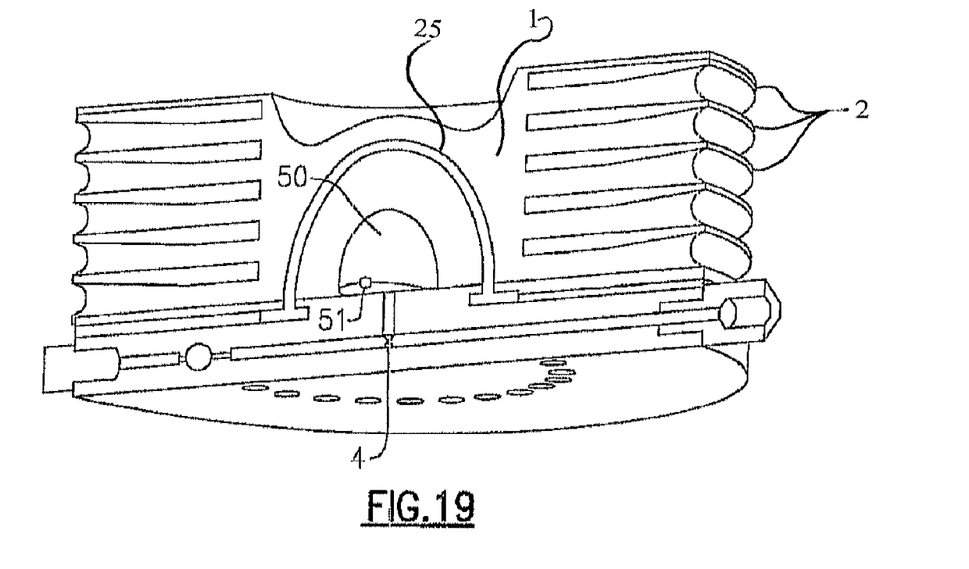
Figure 20:
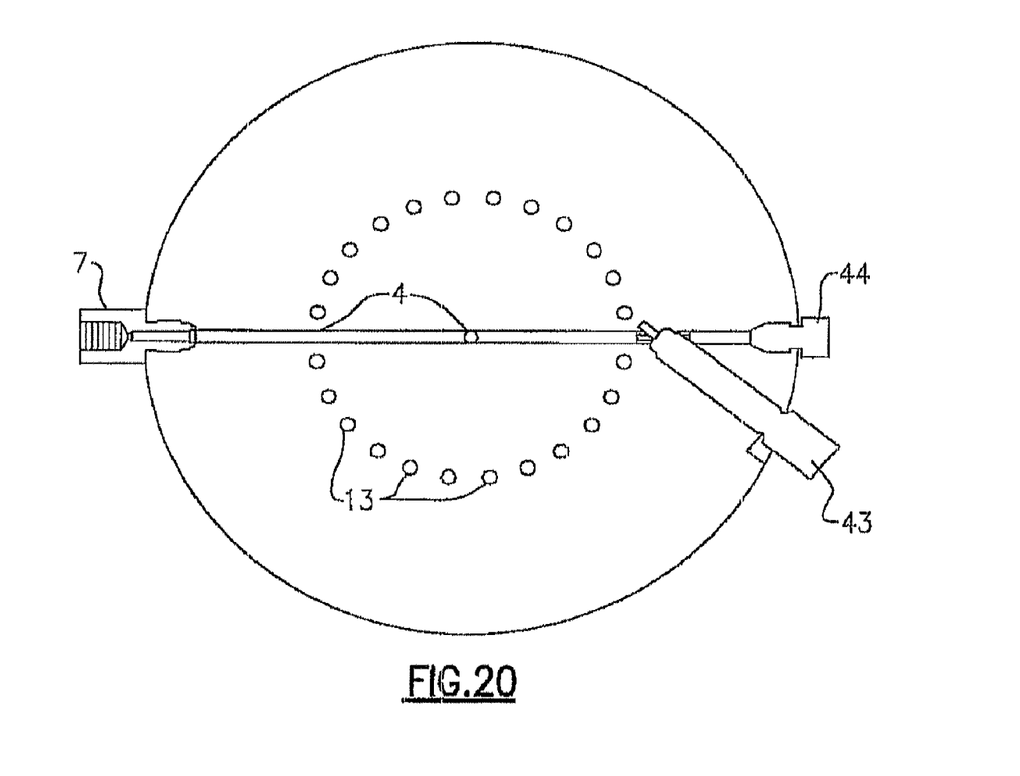

A further possibility for sealing the elements is offered, as mentioned, by the cross-sectionally parabolic membrane (FIGS. 11-15, 17-20), which has a conical or paraboloidal three-dimensional shape. The basic structure is similar to that of the planar membrane, but this design requires a smaller area. This enables a smaller installation space and reduces the costs of the parts. At the same time, however, higher pressures result owing to the smaller area for the same load. For the leak-tight attachment of the parabolic membrane to the membrane plate (9), the membrane is clamped by two beads. For this purpose, the parabolic membrane (25) is pulled over the inner-bead clamping ring lip (24) of the membrane head (9a) like a tire, so that the inner bead (23) is introduced, in a virtually air-free manner, behind the lip (24) with a slight prestress. The membrane plate (9) is subsequently screwed to the prestressing ring (21). However, the outer bead (26) has a significantly larger dimension than the cavity between (21) and (9), so that a prestress results here. This prestress amounts to approximately 10% to 40% of the thickness of the outer bead (26), so that part of the volume of the outer bead is displaced towards the inner bead (23), again resulting in a prestress results and thus achieving the leak-tightness of the bead. In this type of design, the problem that can arise is that the outer bead (26) is displaced on prestressing toward both sides and thus moves between the prestressing ring (21) and the membrane plate (9) before they come together and close the gap. The outer bead (26) would thus be jammed between prestressing ring (21) and membrane (9). To prevent this, a preferably wedge-shaped prestressing free space (22) is provided. This prestressing free space is approximately 2-3 mm (78.7-118.1 mil) deep, i.e. deeper than the material flows under the given prestress, so that undefined jamming of the elastomer from the outer bead (26) is prevented. The clamping can be effected without additional medium. For more secure attachment, it is also possible to introduce adhesive into the joint faces as well, so that an even greater security of the leak-tightness is ensured here. In the case of spring elements based on a parabolic membrane, pressures of 200 to 1500 bar (2901 to 21760 psi) are provided owing to the smaller overall size. The membrane can withstand this pressure only if it is guided cleanly and at all places into the conical cavity of the elastomer component and does not come into contact with the hard intermediate plates. During the operation of the membrane, it will expand to such an extent that the elastomer space within the central holes of the intermediate plates (2) is displaced to a very large extent, i.e. to about 80%, so that the membrane comes relatively close to the intermediate plates. A minimum spacing (28) from the intermediate plates (2) is therefore required. This should be at least 5 mm. The prestress between membrane plate (9) and prestressing plate (21) can also be reversed in a such a way that the inner-bead clamping region of (9) is separated and can be pulled closer by means of screws (FIG. 14). Here too, a prestressing free space (22) should be provided.

Figure 3:
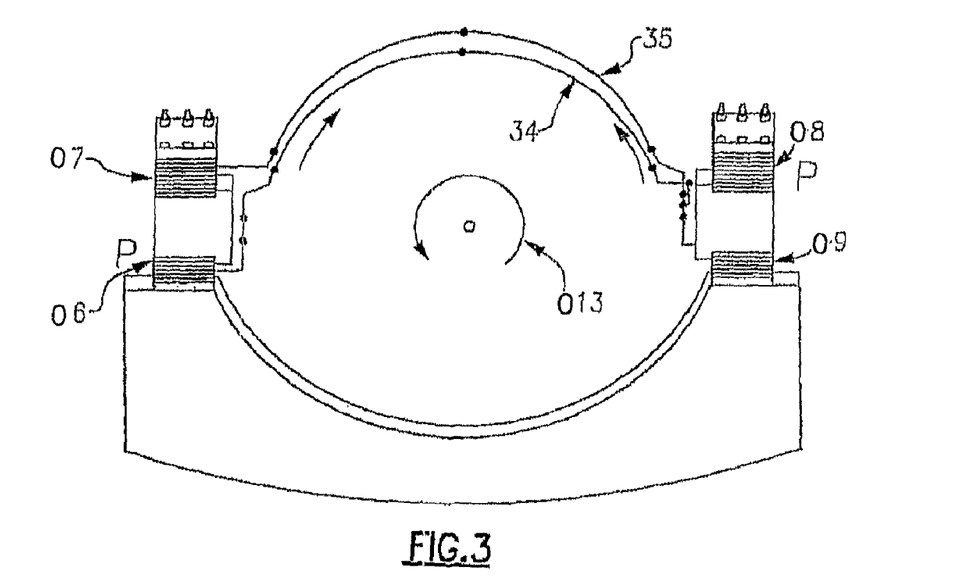
Figure 4:
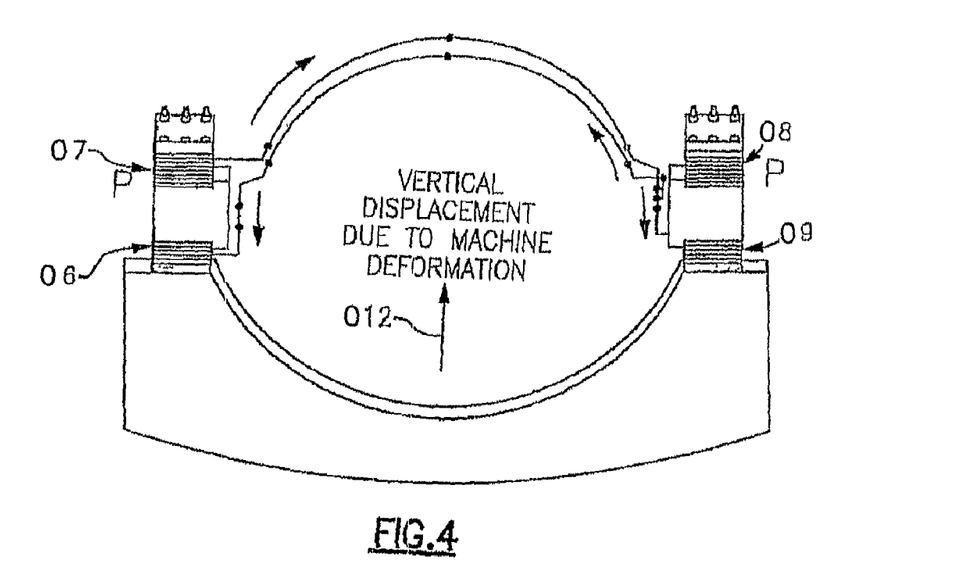

The spring elements fitted in a wind turbine, and bearing arrangements containing such elements, work as follows with respect to the damping of the turbine: the gearbox has a gearbox-side torque support (11) on both sides (FIGS. 1, 2). The latter is embraced by a yoke (10). Elastomer elements (06, 07, 08 and 09) are arranged between the gearbox-side torque support (11) and the yoke (10). The elastomer elements contain a cavity which is filled with fluid. These cavities are interconnected by hydraulic lines (34, 35), which may be rigid pipes or hoses, as illustrated in FIGS. 3 and 4. In the case of the normal torque occurring in the wind turbine, the spring elements (06, 08) are loaded. They are interconnected by the hydraulic line (34) in such a way that the resultant pressure at the same time means that no fluid movement takes place. Likewise, the elastomer elements (07, 09) are simultaneously relieved, so that hydraulic fluid is not moved in the hydraulic line (35) either. In the torque direction, the springs thus exhibit a stiff spring characteristic, i.e. they are not influenced by the hydraulic system.

Figure 5:
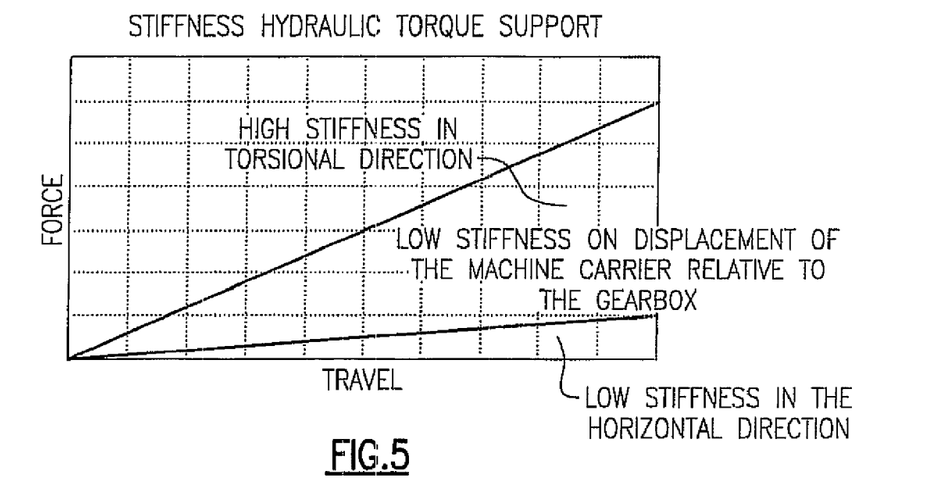

FIG. 5 shows a graph with the high stiffness in the torsion direction and the lower stiffness on vertical displacement of the gearbox with respect to the machine carrier. Thus, in the system according to the invention, high torsional stiffness required for the connection between gearbox and generator can be achieved, while at the same time low displacement stiffness between gearbox and machine carrier is achieved, which leads to the reduction in constraining forces and hence to the relief of gearbox bearings and rotor bearings. In this case, the torsional stiffness is greater than the vertical displacement stiffness by a factor of 4 to 20, preferably 6 to 15. Prinipally, factors up to 100 can be obtained.

As already mentioned, the described spring elements according to the invention are particularly suitable for use as bearing points in two-, four- or multi-point bearing arrangements, preferably in wind turbines. A bearing point preferably consists of two elastomer spring systems which hold the machine part, to be supported, at one point (e.g. at the top and bottom) (FIG. 1). Such an elastomer spring system preferably comprises an elastomer spring according to the invention, but may also comprise a whole arrangement of correspondingly arranged springs. In the hydraulically controlled two-point bearing arrangement of a wind turbine illustrated in FIG. 2, two bearing points each with two elastomer springs are used. The two bearing points are connected to one another by hydraulic lines (FIGS. 3 and 4), to be precise in such a way that one elastomer spring of one bearing point is connected to the opposite elastomer spring of the other, opposite bearing point (crosswise connection). If the elastomer layer at one bearing point is now compressed by forces acting from the machine region, hydraulic fluid is inevitably forced through the corresponding line into the opposite bearing point's spring element connected to it and at the same time compresses the elastomer layer of the latter. As a result, optimum stiffness regulation and thus clamping can take place.

In FIG. 4 the vertical displacement due to machine deformation is shown. On displacement of the gearbox upward by the machine carrier, the following happens: the spring elements (07) and (08) experience an increase in pressure, while the pressure in the elements (06) and (09) drops. Owing to the crosswise laying of the connecting lines of the spring elements (08) to (06), the fluid flows from the more heavily loaded upper part to the relieved spring element (06), which causes a reduction in the resistance force of the elastomer element (08), while at the same time the fluid reduction resulting in the elastomer element (06) is replenished by the fluid from the spring element (08). The same principle applies between the spring elements (07) and (09), so that this vertical movement takes place with markedly lower spring stiffness.

In the extreme load case, as already explained, significantly higher torques occur than in normal operation. The extreme load case describes a critical situation of the wind turbine. The system according to the invention provides that a pressure relief valve (31) is fitted between the pressure line (34) subjected to torque on the relief side (35) which is under low pressure in this state. If, in this rarely occurring extreme load case, a high pressure occurs in the pressure line (34), the pressure relief valve (31) is opened. The fluid thus flows from the pressurized line (34) into the line (35) with lower pressure. The flow rate in this line is reduced by the throttle (33), so that a powerful damping function results. Thus, the loads of the wind turbine which occur under extreme load are reduced with the aid of the valve function (31) of the throttle (33). The elastomer components are designed so that they can also continue to be operated without fluid. On the next stoppage, which occurs at intervals or is initiated after an extreme load situation, the valve (32) is automatically opened, so that equal pressure again results in the connecting lines (34 and 35), which is the case after a short time. The system is then in the original state again, so that the pressure switch (32) can be reclosed.

Besides the reduction in vibration, the above-described valve function also has the advantage that the hydraulic lines do not have to be designed for the pressure prevailing under extreme load. Furthermore, the extreme loads can be reduced by the damping occurring in the connecting line by means of the additional throttle (33). While the pressure relief valve (31) along with the throttle (33) are effective only in the extreme load case, further throttles (36 and 37) can be arranged on the pressure side and relief side. These throttles produce damping in the entire system while the turbine is operating. In other words, any displacement of the machine frame is generally to be associated with vibrations of the entire turbine. These vibrations are damped by the throttles (36 and 37) present, which brings about a load reduction in the wind turbine. The throttles (36 and 37) may be fitted in the form of adjustable throttles in accordance with the prior art. However, it is also possible to dimension all the hydraulic lines in such a way that the throttling function is already brought about by the fluid friction in the lines.

All functions described hitherto are passive, i.e. without any outside influence. However, it is also possible to operate the system actively. To this end, fluid is alternately pumped into and drained from the different chambers, so that a constrained movement counteracting the undesired vibrations and movements takes place with this system in the force flow path of the wind turbine.

The invention claimed is:

1. A spring element in which stiffness is adjusted by hydraulically produced pressure, the spring element comprising:

(I) at least two elastomer layers (1),
(ii) at least one non-elastic intermediate layer (2), and
(iii) at least one hydraulic device (4, 7, 9, 11, 12),
the elastomer layers being separated from one another by the non-elastic intermediate layer, and
the non-elastic intermediate layer having a centrally arranged opening so that the spring element has, at least in an interior thereof, a continuous elastomer core region to which the individual elastomer layers are connected, and
the hydraulic device being mounted at at least one of an upper and a lower end of the spring element and, by introduction of a hydraulic fluid into the spring element, hydraulic pressure causing compression of the elastomer layers (1) in a vertical direction with respect to the elastomer layers and the non-elastic intermediate layer of the spring element, and thus at least one of resulting in and increasing a hydraulic fluid-containing displacement space in the elastomer core region of the spring element; and
an elastic correspondingly shaped pressure membrane (5, 25) being arranged between the elastomer layers (1) of the spring element and the displacement space,
the pressure membrane (5, 25) being connected at its edge to the hydraulic device, resulting in a hydraulic fluid-containing membrane space (12) which, in a case of a hydraulic pressure, corresponds to the displacement space, and
the hydraulic device being connected to the membrane space, via a hydraulic line (4), and comprising at least one sealing element (10, 10a, 6, 21, 22, 24) which is prestressed and is arranged such that an increased pressure is generated on the pressure membrane in a region of the connection of the pressure membrane to the hydraulic device, compared with pressure in the membrane space, so that the membrane space is closed off in a pressure-tight manner from the elastomer layers and the non-elastic intermediate layer of the spring element and the hydraulic device.

2. The spring element as claimed in claim 1, wherein the elastic pressure membrane (5) rests on a membrane plate (9) belonging to the hydraulic device, and the elastic pressure membrane (5) is connected at its edge to the membrane plate via an elastic bead (10) which fills a T-slot-shaped recess (10a) in the membrane plate, and a non-elastic pressure-increasing element (6) is arranged between the elastomer layers (1) and the pressure membrane, in the region of the elastic bead, the non-elastic pressure-increasing element (6) has a corresponding profile which, under prestress, is forced into an elastic material in the region of the elastic bead of the pressure membrane, and thus leads to sealing in a region of the T-slot-shaped recess of the membrane plate.

3. The spring element as claimed in claim 2, wherein the non-elastic pressure-increasing element (6) is a profiled ring.

4. The spring element as claimed in claim 2, wherein a prestressing free space (10c) is present between the pressure-increasing element (6) and the elastic bead (10) of the pressure membrane.

5. The spring element as claimed in claim 1, wherein a membrane plate (9) is compressed, in the region of a T-slot-shaped recess, so that sealing occurs in the region of the T-slot-shaped recess.

6. The spring element as claimed in claim 2, wherein the membrane plate (9) comprises a bottom of the membrane space (12) and has a concave surface.

7. The spring element as claimed in claim 6, wherein the membrane plate is concavely curved.

8. The spring element as claimed in claim 1, wherein the elastomer layers (1) are concavely curved in the region of a contact surface with the pressure membrane (5).

9. The spring element as claimed in claim 7, wherein one of the membrane space and the displacement space is lenticular shaped.

10. The spring element as claimed in claim 2, wherein the membrane plate (9) has at least one hydraulic supply line (4) and at least one hydraulic connection (7) which passes through the membrane plate and communicates with the membrane space.

11. The spring element as claimed in claim 10, wherein the spring element has a support plate (11) for the elastomer layers (1).

12. The spring element as claimed in claim 11, wherein the membrane plate (9) is separate from the support plate (11).

13. The spring element as claimed in claim 12, wherein the membrane plate is clamped to the support plate.

14. The spring element as claimed in claim 1, wherein the elastic pressure membrane (25) has a circumferential terminal T-shaped elastic bead (10), which comprises an outer bead (26) and an inner bead (23) and is connected, in a pressure-tight manner, to a membrane plate (9) of the hydraulic device in such a way that the outer and the inner beads are inserted in a correspondingly T-shaped hollow profile which is formed by a correspondingly shaped membrane head (9a) and a prestressing disk (21), where
  (a) the membrane head is arranged inside the membrane and the membrane space (12) and has a circumferential projecting lip which receives the inner bead (23) of the membrane, and
  (b) the prestressing disk (21) has an annular opening which receives the membrane head (9a) with the pressure membrane in a precisely fitting manner, and an edge of the opening is formed by a projecting lip which receives the outer bead (26) of the membrane.

15. The spring element as claimed in claim 14, wherein the prestressing disk (21) rests at least partially on the membrane plate (9) and is arranged between the membrane plate (9) and the elastomer layers (1).

16. The spring element as claimed in claim 14, wherein the prestressing disk (21) is a support plate for the spring element and has, in a region of the pressure membrane, a recess into which the corresponding membrane plate (9) is inserted.

17. The spring element as claimed in claim 15, wherein the prestressing disk (21) is connected to the elastomer layers (1) outside a region of the pressure membrane.

18. The spring element as claimed in claim 14, wherein the membrane plate (9) is clamped against the prestressing disk (21) by fasteners so that the T-shaped elastic bead (23, 26) of the pressure membrane is compressed.

19. The spring element as claimed in claim 14, wherein the membrane plate (9) has a hydraulic supply and a hydraulic connection (4, 7), and the hydraulic supply leads through the membrane head (9a) and into the membrane space (12).

20. The spring element as claimed in claim 14, wherein a prestressing free space (22) is provided which, in an unclamped state, is formed in a region in which the outer bead (26), the membrane plate (9) and the prestressing disk (21) meet, and which completely closes when the membrane plate (9) and the prestressing disk (21) are clamped.

21. The spring element as claimed in claim 14, wherein the pressure membrane (25) is stiff and has a conical surface which, with the membrane head (9a) located at a base, forms one of a correspondingly shaped conical membrane cavity (12) and a conical membrane cap (12a).

22. The spring element as claimed in claim 21, wherein the elastomer layers (1) have, in the elastomer core region of the spring element, a conical cavity which is shaped to correspond to the membrane cavity (12) and is filled by the conical membrane cap (12a) formed by the pressure membrane.

23. The spring element as claimed in claim 21, wherein the membrane cavity (12) of the membrane cap (12a) has a stop device (50) which, in the event of overloading of the hydraulic device, prevents the pressure membrane from irreversibly collapsing.

24. The spring element as claimed in claim 23, wherein the stop device (50) is a non-elastic material formed as a conical cap which is arranged in the interior of the membrane cavity (12) on the base of the membrane head (9a) and has a supply conduit and a connection to the hydraulic line (4).

25. The spring element as claimed in claim 1, further comprising the hydraulic device mounted on one side of the spring element.

26. The spring element as claimed in claim 25, further comprising, on a side opposite the hydraulic device in the elastomer core region of the spring element, a cavity (40) in the elastomer layers, which is shaped and configured in such a way that the cavity (40) is separated from the membrane space (12) by a web (42) of elastomer material of the elastomer layers (1), so that the web can be pushed into the one of the cavity and the recess when the hydraulic pressure in the membrane space increases.

27. The spring element as claimed in claim 26, wherein the cavity (40) has a non-elastic calibration element (3, 8) by which a volume of the cavity (4) is altered.

28. A machine bearing comprising at least two spring elements in which stiffness is adjusted by hydraulically produced pressure, each spring element comprising:
  (I) at least two elastomer layers (1),
  (ii) at least one non-elastic intermediate layer (2), and
  (iii) at least one hydraulic device (4, 7, 9, 11, 12);
    the elastomer layers (1) being separated from one another by the non-elastic intermediate layer (2), and the non-elastic intermediate layer (2) having a centrally arranged opening, so that the spring element has, at least in an interior thereof, a continuous elastomer core region to which the individual elastomer layers are connected, and the hydraulic device being mounted at least one of an upper and a lower end of the spring element and, by introduction of a hydraulic fluid into the spring element hydraulic pressure-causing compression of the elastomer layers (1) in a vertical direction with respect to the elastomer layers and the non-elastic intermediate layers of the spring element, and thus at least one of resulting in and increasing a hydraulic fluid-containing displacement space in the elastomer core region of the spring element; and an elastic correspondingly shaped pressure membrane (5, 25) is arranged between the elastomer layers (1) of the spring element and the displacement space, and the pressure membrane (5, 25) is connected at its edge to the hydraulic device, resulting in a hydraulic fluid-containing membrane space (12) which, in a case of a hydraulic pressure, corresponds to the displacement space, and the hydraulic device is connected to the membrane space via a hydraulic line (4) and comprises at least one sealing element (10, 10*a*, 6, 21, 22, 24) which is prestressed and is arranged such that an increased pressure is generated on the pressure membrane in a region of a connection of the pressure membrane (5, 25) to the hydraulic device, compared with pressure in the membrane space, so that the membrane space is closed off in a pressure-tight manner from the elastomer and non-elastic intermediate layers of the spring element and the hydraulic device.

29. The bearing as claimed in claim 28, wherein the spring elements are connected to one another by hydraulic lines (34, 35) arranged crosswise.

30. The bearing as claimed in claim 29, wherein the hydraulic lines are equipped with at least one pressure relief valve (31) and a throttle valve (33, 36, 37).

31. The bearing as claimed in claim 28, in combination with a wind turbine wherein the bearing absorbs bending forces, deformation forces and displacement forces in the wind turbine.

32. The bearing as claimed in claim 31, in combination with the wind turbine wherein the bearing absorbs bending forces, deformation forces and displacement forces while under load which occurs vertically with respect to mounted spring elements.

* * * * *